(12) United States Patent  (10) Patent No.: US 8,379,814 B2
Frey  (45) Date of Patent: Feb. 19, 2013

(54) LINKED NUMBER SERVICE

(75) Inventor: Alan E. Frey, Naperville, IL (US)

(73) Assignee: Alcatel Lucent, Paris (FR)

( * ) Notice: Subject to any disclaimer, the term of this patent is extended or adjusted under 35 U.S.C. 154(b) by 1168 days.

(21) Appl. No.: 12/287,403

(22) Filed: Oct. 9, 2008

(65) Prior Publication Data

US 2010/0091963 A1  Apr. 15, 2010

(51) Int. Cl.
  *H04M 15/00* (2006.01)
  *H04M 3/42* (2006.01)
(52) U.S. Cl. .......... 379/114.21; 379/201.01; 379/211.04
(58) Field of Classification Search ............. 379/114.21, 379/114.27, 127.03, 142.07, 201.01, 211.02, 379/211.04, 212.01, 221.01
See application file for complete search history.

(56) References Cited

U.S. PATENT DOCUMENTS

| | | | | |
|---|---|---|---|---|
| 6,324,269 B1 * | 11/2001 | Malik | ...................... | 379/114.23 |
| 6,925,159 B1 * | 8/2005 | Blackburn et al. | ....... | 379/114.05 |
| 6,925,160 B1 * | 8/2005 | Stevens et al. | ........... | 379/121.05 |
| 7,042,994 B2 * | 5/2006 | Hanna et al. | ............. | 379/121.02 |
| 2008/0069330 A1 * | 3/2008 | Burckart et al. | ......... | 379/210.01 |
| 2011/0026457 A1 * | 2/2011 | Shim | ............................ | 370/328 |

\* cited by examiner

*Primary Examiner* — Quoc D Tran

(74) *Attorney, Agent, or Firm* — Carmen Patti Law Group, LLC

(57) ABSTRACT

An apparatus in one example comprises a communications network, a first communication device that is associated with a first communication device identifier and a second communication device that is associated with a second communication device identifier. The first communication device is communicatively coupled with the communications network, the second communication device is communicatively coupled with the communications network and the first communication device is communicatively coupled with the second communication device via the communications network. And, the second communication device originates a communication session using the first communication device identifier, and termination attempts to the first communication device are received by the second communication device and the first communication device.

17 Claims, 11 Drawing Sheets

LINKED NUMBER SERVICE

TECHNICAL FIELD

The invention relates generally to a method and apparatus for linked number services and more particularly to allowing a subscriber to make and receive calls on a first communication device as if the subscriber were using a second communication device.

BACKGROUND

In recent years people have become more and more dependent on communication devices at work and at home. Because of the importance of staying in contact, missed calls can be frustrating and costly. Business people want to stay in constant contact with clients and personal associates. To keep up with the demands of constant availability, business people have either been carrying two mobile phones or giving out their personal phone number so that clients can reach them at all hours.

If an employee uses a private phone for business purposes, problems may arise, such as, who will pay the phone bill. Even if the employee gets his employer to pay for business calls made on a personal phone, discrepancies may arise when trying to figure out which charges are personal and which charges are business related. Also, if an employee uses his personal mobile phone for work calls, the recipient of the call may not take the call because the recipient may not recognize the calling line identification of the employee's personal phone. Further, although a company may reimburse an employee for phone use, the company may not want to pay for certain calls. Indeed, a company may restrict an employee's phone use. For example, an employer may not pay for long distance calls. When an employee uses his personal mobile phone for business purposes, the employee's use is unrestricted. Thus, either the company may get stuck with charges the company normally would not allow, or the employee may get stuck paying for a business call that he did not know he should not make.

An employee may want to avoid carrying multiple phones to meet business and personal needs. Even though an employer may agree to reimburse charges for business calls made on a personal phone, the employer may want to restrict the types of calls that an employee makes. Also, an employee may want to make and receive business calls using his personal mobile phone as if he was using his business phone. The employee may not want to worry about separating charges for business and personal calls. Further, the employee may want services available on his business phone to also be available on his personal phone. For example, the employee may want to know when he receives voicemail messages at his business phone by having a message waiting indicator light up on his personal phone. Or, the employee may want to receive, on his personal phone, text messages that are sent to his business phone. On the other hand, the employee may want to control hours that business calls come into his personal phone. For example, the employee may not want to receive business calls on his personal phone after 8:00 pm. Or, the employee may not want to receive business calls on Sunday.

SUMMARY

The invention in one implementation encompasses an apparatus. The apparatus in one embodiment comprises a communications network, a first communication device that is associated with a first communication device identifier and a second communication device that is associated with a second communication device identifier. The first communication device is communicatively coupled with the communications network, the second communication device is communicatively coupled with the communications network and the first communication device is communicatively coupled with the second communication device via the communications network. And, the second communication device originates a communication session using the first communication device identifier, and termination attempts to the first communication device are received by the second communication device and the first communication device.

The invention in another implementation encompasses a method. The method in one embodiment comprises the steps of terminating a communication session to a first communication device and a second communication device if an attempt to terminate the communication session is to the first communication device identifier. The first communication device is associated with a first communication device identifier and the second communication device is associated with a second communication device identifier. And, originating a communication session with the second communication device where the first communication device identifier is presented as a calling line identifier.

The invention in one implementation encompasses an apparatus. The apparatus in still another embodiment comprises an, a telephony application server, a linked number service application server, a telephony network, a first communication device that is associated with a first communication device identifier and a second communication device that is associated with a second communication device identifier. The first communication device is communicatively coupled with the telephony application server, the telephony application server is communicatively coupled with the linked number service application server, the linked number service application server is communicatively coupled with the telephony network and the telephony network is communicatively coupled with the second communication device. And, the second communication device originates a communication session using the first communication device identifier, and termination attempts to the first communication device are received by the second communication device and the first communication device.

DESCRIPTION OF THE DRAWINGS

Features of example implementations of the invention will become apparent from the description, the claims, and the accompanying drawings in which:

DETAILED DESCRIPTION

Figure 1:
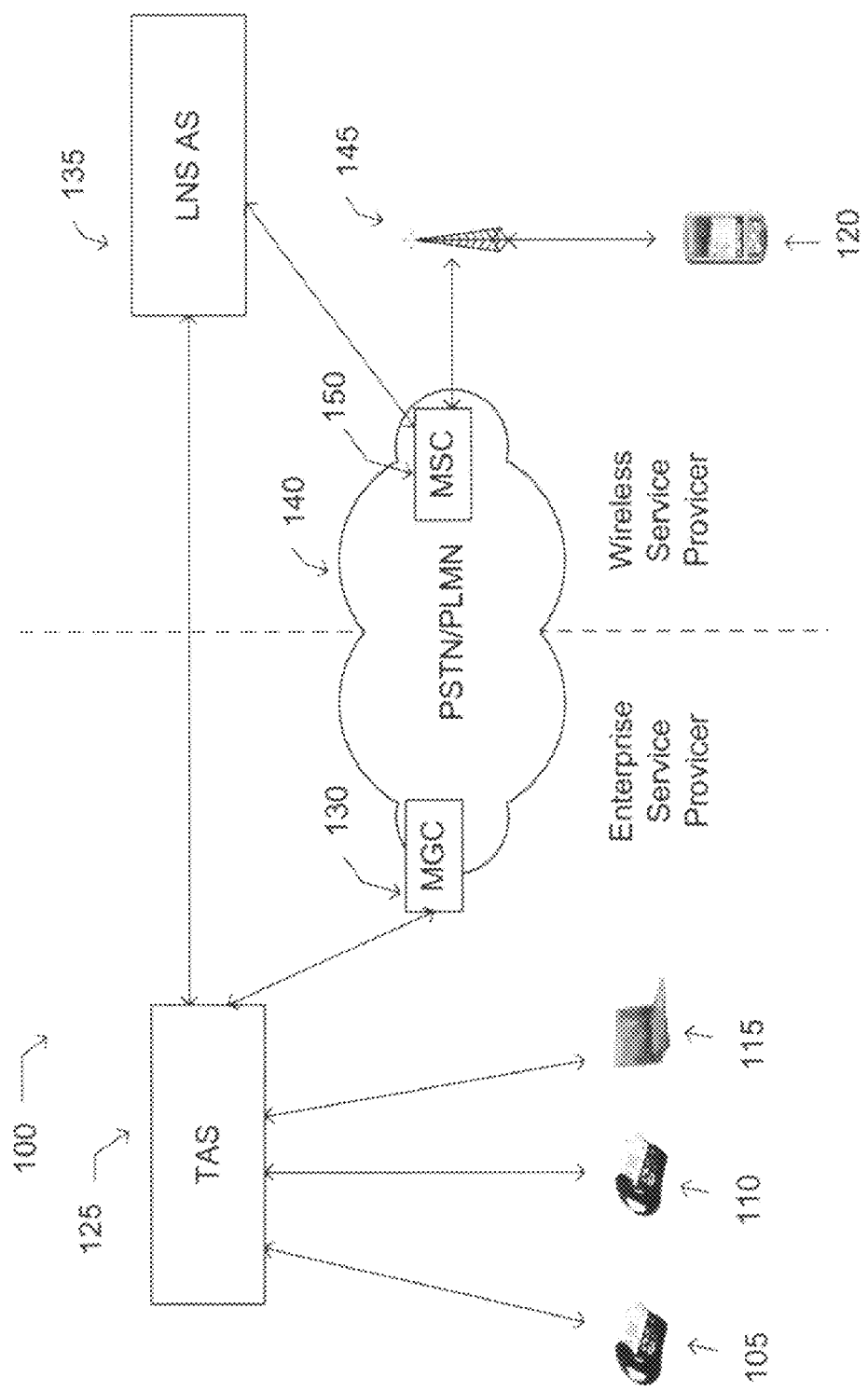
FIG. 1 is a representation of one implementation of a network comprising the linked number service.

As telecommunication services become more and more common, people are using their personal phones for business purposes and using their business phones for personal purposes. When a personal phone, such as a cell phone, is used for business purposes, an employee may want to have access to services and features that are available on the employee's business phone. Also, to stay in contact with clients, an employee may want calls that are made to his business phone available for receipt on his personal phone. In particular, an employee may want to be able to answer calls that are made to his business phone by using his personal phone. Alerting personal and business phones when a call comes into the business phone, and connecting the call to the phone that answers first may accomplish this goal.

Not only may an employee want to have the ability to answer calls to his business phone by using his personal phone, an employee may also want a personal phone to act like his business phone and still be able to use his personal phone for individualized purpose. In particular, the employee may want to originate calls using the calling line identification of the business phone, have business calls billed to a company phone bill and personal calls billed to the personal phone bill. Further, the employee may want to have a message waiting indicator light on his personal phone when a message is available at his business phone, and have text messages that are sent to his business phone forwarded to his personal phone.

Yet, the employee may want to retain control of his free time. Thus the employee may want to screen incoming business calls based on a white list or black list. Also, the employee may want to control when business calls are allowed to alert his personal phone.

An approach to offering services as described above is to link a work phone (and the number associated with this work phone) to a personal mobile phone (and the number associated with this mobile phone). The phone numbers may be defined in terms of a principal directory number (the phone number associated with the business phone) and a directory number (the phone number associated with the mobile phone). When a principal directory number is called, the communication device associated with the principal directory number will be alerted, and the communication devices associated with any directory numbers linked to the principal directory number may also be alerted. A call from a communication device associated with a directory number that is linked to a principal directory number may use the principal directory number as the calling line identification that is presented to a called party for a call originated from this communication device. For example, a personal communication device, such as, a mobile phone may be linked to a business phone. In this example, the number associated with the business phone may be the principal directory number and the number associated with the personal mobile phone may be the directory number. When a subscriber uses the personal mobile phone to make a call, the principal directory number associated with the business phone may be used as the calling line identification that is presented to a called party. Further, when the subscriber makes a personal call using the personal mobile phone the call is billed to his personal bill, when the subscriber makes a business call using the personal mobile phone the call is billed to his employer's account. Also, the subscriber may be in control of whether the number associated with the personal mobile phone or the number associated with the business phone is presented as a calling line identifier. The subscriber may also screen calls. On the other hand, a business may be able to restrict business calls that are made from a subscriber's personal phone.

Herein, alerting a mobile phone may comprise ringing, flashing, or vibrating the mobile phone as part of an attempt to complete a call termination to the mobile phone. A directory number may be associated with at least one communication device. A communication device may be a mobile phone, a landline phone, a personal digital assistant or any other type of device capable of completing a voice or data call. A communication session may be a voice call, a data call, a text message or any other way of communicating between two communication devices.

Turning now to FIG. 1, which depicts a system 100 where the linked number service (LNS) may reside. The system 100 may be comprised of a plurality of communication devices 105, 110, 115, 120 that may be communicatively coupled to a communications network 100. The communications network 100 may be comprised of a telephony application server (TAS) 125, a linked number service application server (LNS AS) 135, telephony network 140 and a base station controller (BSC) 145. The telephony network may be comprised of one or more public switched telephony networks (PSTN) or public land mobile networks (PLMN). The PSTN/PLMN or telephony network 140 may be further comprised of a media gateway controller (MGC) 130 and a mobile switching center (MSC) 150.

The communication devices 105, 110, 115, 120 depicted include landline phones 105 110, a laptop 115 and a personal digital assistant (PDA) 120. The landline phones may be typical phones found in an office that may be connected to a Centrex/PBX or may be connected directly to a PSTN/PLMN. The laptop may be a laptop located in an office. The laptop may be running software that enables it to make and receive calls. The communication devices 105, 110, 115 may be part of an office phone system. Thus, services such as extension dialing may be available to the devices 105, 110, 115. In the embodiment depicted, the phones 105, 110 and the laptop 115 may have an Internet Protocol (IP) connection to the TAS 125. Thus the phones 105, 110, 115 may initiate voice over IP (VOIP) calls via the TAS 125. The PDA 120 may be a PDA that is capable of making wireless phone calls. Thus, the PDA may communicate with the base station 145 to make and receive phone calls.

The TAS 125 may act as a SIP user agent that maintains a call state. The TAS 125 may contain service logic that provides basic call processing services. In some embodiments, the TAS 125 may be part of an Internet protocol Multimedia Subsystem (IMS) network. The LNS AS 135 may be a network node which supports the linked number service.

The PSTN/PLMN or telephony network 140 may be any public switched telephony network, public land mobile network, a combination of PSTNs and PLMNs, or any other type of network or combination of networks that is capable of establishing a communication session between two communication devices. The MGC 130 may act as a signaling gateway between the TAS 125 and the PSTN/PLMN 140. The MSC 150 may be any type of switching device capable of performing call switching functions needed to complete a communication session. A BSC 145 may act as a wireless intermediary between the PDA 120 and the MSC 150.

The landline phones 105, 110 and the laptop 115 may be communicatively coupled with the TAS 125. The interface between the communication devices 105, 110, 115 and the TAS 125 may be a Session Initiation Protocol (SIP) that runs over the Internet Protocol. The TAS 125 may be further communicatively coupled with the LNS AS 135 and the MGC 130. The interface between the TAS 125 and the LNS AS 135 may be an HTTPS interface. The TAS 125 and LNS AS 135 may use the HTTPS protocol to send proprietary messages. The interface between the TAS 125 and the MGC 130 may be a SIP interface.

The LNS AS 125 may be further communicatively coupled with the MSC 150. The interface between the MSC 150 and the LNS AS 135 may be a Customized Applications for Mobile network Enhanced Logic (CAMEL) interface. The MSC 150 may be communicatively coupled with the BSC 145. One of ordinary skill in the art will readily appreciate that the interface between the MSC 150 and the BSC 145 may a standard interface such as an A interface or a proprietary interface of the equipment vendor which provided the MSC 150 and BSC 145. The BSC 145 may be communicatively coupled with the communication device 120. The interface between the BSC 145 and the device 120 may be a wireless protocol such as CDMA, TDMA, GSM or any other wireless protocol that may be used to establish a communication session between a communication device and a BSC.

In an embodiment, a communication device that subscribes to the linked number service may be associated with a directory number. A directory number may be a unique identifier used to address a communication device. An example of a directory number may be a phone number. Some directory numbers may be principal directory numbers. Principal directory numbers retain all the attributes of a directory number, but are given the designation of a principal directory number. As discussed, a principal directory number may be linked to one or more other directory numbers. Linked number services may be performed based upon which directory number is a principal directory number. For example, if a directory number is linked to a principal directory number, calls to the principal directory number result in the phone associated with the directory number and the phone associated with the principal directory number both being alerted. The subscriber may then answer the call on either the communication device associated with the principal directory number or the communication device associated with the directory number. Once one of the communication devices is answered, alerting the other communication device stops. Calls to the directory number, however, only result in the phone associated with the directory number being alerted and do not result in the phone associated with the principal directory number being alerted.

If an owner of a communication device subscribes to the linked number service, and if the owner wants to link to a different directory number, the owner of the communication device associated with the different directory number must also subscribe to the linked number service. For example, the owner of communication device 105 may be a business. The business must subscribe to the linked number service. The communication device 105 may be the desk phone of employee A. PDA 120 may be a personal phone of employee A. If the business owner wants to link the directory number associated with communication device 105 with the directory number associated with the PDA 120, employee A must also subscribe to the linked number service for the directory number associated with the PDA 120. For purposes of illustration, we will go forward with the presumption that the directory number associated with the communication device 105 is a principal directory number, and the directory number associated with the PDA 120 is a directory number. Further, the principal directory number associated with the communication device 105 is linked to the directory number associated with the PDA 120.

Although in the example depicted, the communication devices 105, 110, 115 depicted are in communication with a TAS, in other embodiments the devices 105, 110, 115 may be connected to a PBX, a Centrex, a landline switch, a mobile switch or any other telecommunications node capable of completing a communication session.

Figure 2:
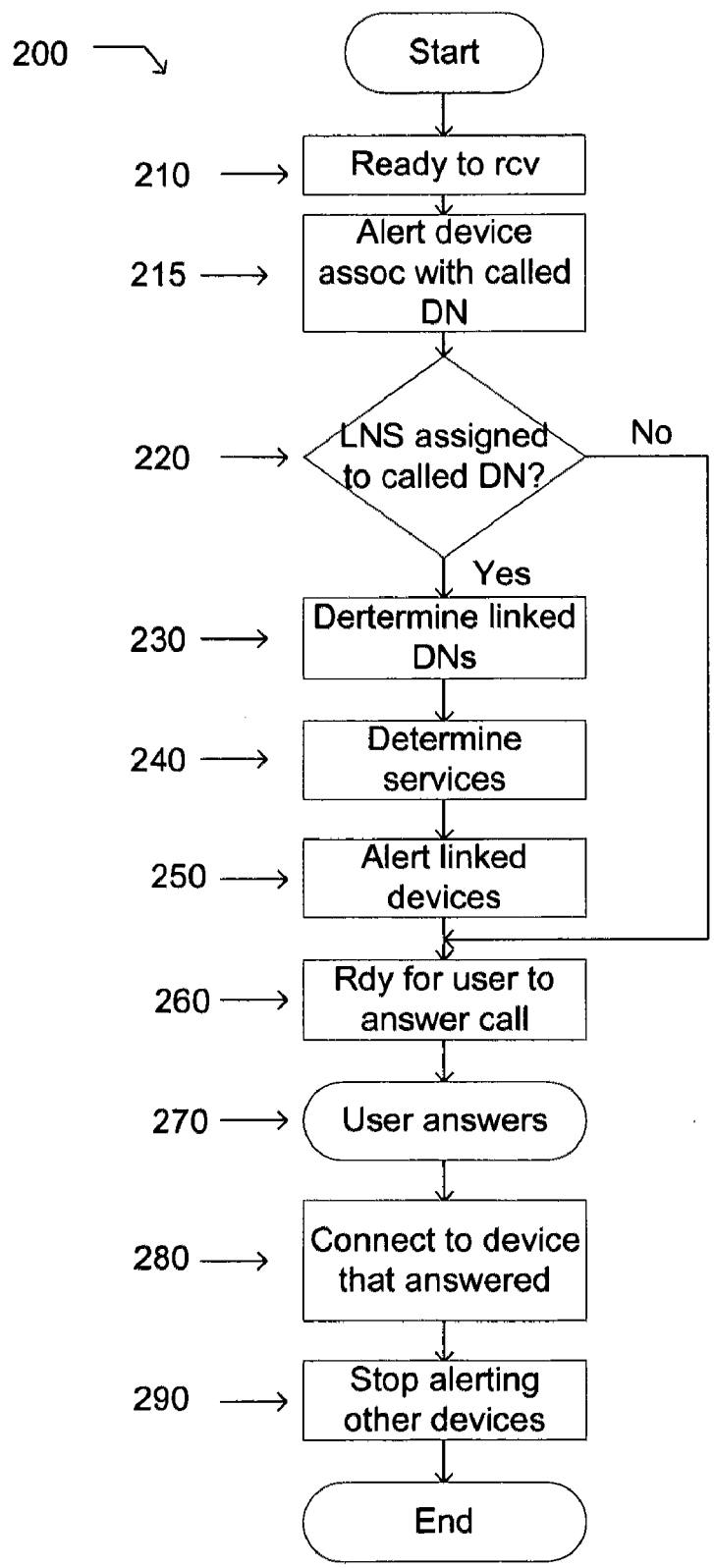
FIG. 2 is a representation of a flow chart of a call to a principal directory number.

Turning to FIG. 2, which depicts a method 200 illustrating a call to a principal directory number. The method 200 may be executed in the system 100 depicted in FIG. 1. In step 210, the method 200 is ready to receive a call. In step 215, the method 200 first alerts the communication device associated with the directory number being called, in this example the principal directory number. In step 220, the method 200 then determines if linked number service is active for the called number 220; if the linked number service is not active, the method 200 proceeds to the state where it is waiting for the user to answer the call 260. If the linked number service is active, the method 200 determines the directory number(s) 230 that are linked to the principal directory number. Herein, unless otherwise stated, a call to a directory number may be interpreted as a call to a communication device that is associated with the directory number. Also, a call to a communication device may be interpreted as a call to a directory number that is associated with the communication device.

The method 200 determines which directory numbers are linked to the principal directory number 230. The method 200 determines services and restrictions that may be associated with the principal directory number 240. For example, the method 200 may determine if calls to directory numbers linked to the principal directory number should be screened based on time of day, or screened based on the calling number being on a black or white list. For example, services associated with the principal directory number may be configured such that a directory number linked to a principal directory number may not receive calls after 5:00 pm or before 8:00 am. Or, services may be configured such that only calls from directory numbers on the white list result in alerting the linked directory number. Or, services may be configured such that calls from numbers on the black list are blocked.

Further, the method 200 may determine other services that may be linked to the principal directory number which affect call completion. For example, the principal directory number may be blocking all incoming calls, this may affect whether linked directory numbers are alerted. The method 200 then alerts the communication devices associated with directory numbers that may be linked with the principal directory number 250 and proceeds to the state where it is waiting for the call to be answered by one of the communication devices being alerted for the call 260. In step 270, if one of the communication devices being alerted for the call answers, the call is connected to this communication device 280, and alerting of any other communication devices is stopped 290.

As discussed, a call to the principal directory number may be screened based on time of day, white lists and black lists. The white lists, black lists and time of day screening parameters may be kept in tables in the system 100. The table may be configurable by a system operator or a subscriber. Also, the hierarchy of the services may be arranged in different orders that may affect how a call to the principal directory number is handled. For example, the white list may be configured to override the time of day call screening such that a call from a directory number on the white list to the principal directory number, may result in alerting directory numbers linked to the principal directory number regardless of the time of day. Further, the tables may be configured such that each directory number linked to a principal directory number has its own call screening lists. Any examples herein should not be construed to limit how the white list, black list or time of day screening tables may be configured, arranged or implemented.

Figure 3:
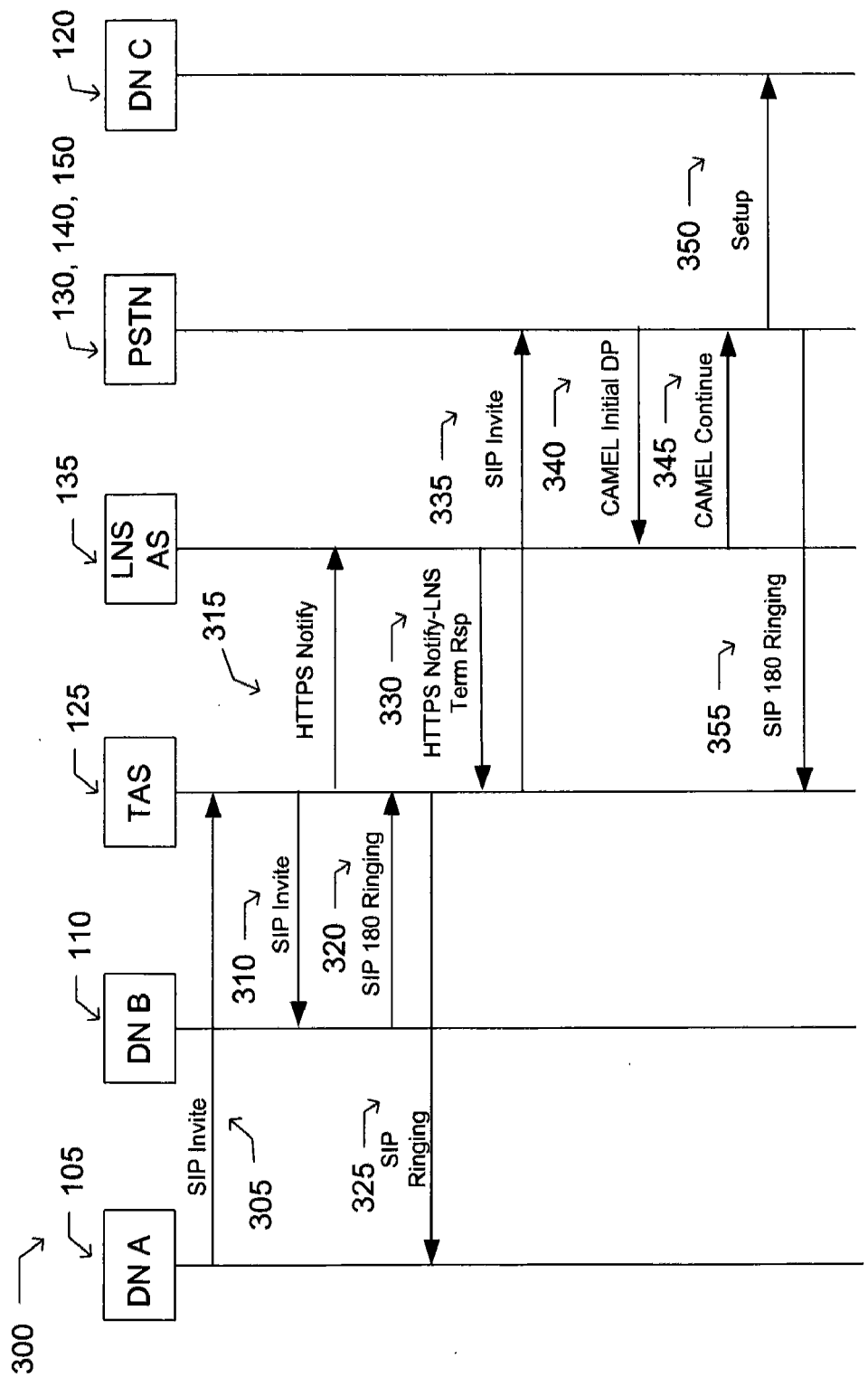
FIG. 3 is a representation of a message flow of a setup of a call to a principal directory number.

Turning now to FIG. 3, which is a message flow 300 of a call to a principal directory number. The message flow 300 depicted in FIG. 3 may occur in the system 100 depicted in FIG. 1. In this example, the communication devices 105, 110, 115 may be communicating with the TAS 125 using VOIP. Although, the example given in FIG. 3 incorporates the use of a local phone system based on an IP telephony network, the linked number service may be used in conjunction with circuit switched telephony networks or any other type of telephony network. Thus, although the communication devices 105, 110, 115 are depicted as being in communication with the TAS 125, in an IP environment the communication devices 105, 110, 115 may be used in conjunction with a circuit switched network element, such as a 5E-switching node.

The communication device 105, which may be associated with a directory number A (DN A), places a call to the device 110, which may be associated with a directory number B (DN B). As a result of the origination, a SIP Invite message 305 is sent to the TAS 125. The TAS 125 may have an LNS lookup table that contains a list of directory numbers that are subscribed to the Linked Number Service. Assume that DN B is a principal directory number, and the directory number associated with the PDA 120 (DN C) is a directory number linked to the principal directory number DN B. Because the call made by DN A was to DN B, the TAS 125 may look up the principal directory number DN B and note that DN C is linked to DN B. Because the TAS 125 serves DN B, the TAS 125 may send a SIP Invite 310 to the device 110 associated with DN B. Because the directory number DN C is not served by the TAS 125, the TAS 125 may perform a look-up to determine that the directory number DN C is served by the LNS AS 135. The TAS 125 may then send an HTTPS notify message 315 to the LNS AS 135. The LNS AS 135 may store the calling party number DN A, the principal directory number DN B, and the linked directory number DN C contained in the HTTPS notify 315 for future reference. Also, the LNS AS 135 may determine if the call should be screened. Thus, based on the linked directory number DN C, the principal directory DN B and the calling number DN A, the LNS AS 135 may examine time of day screening tables, white lists and black lists to determine if the call should be screened. The LNS AS 135 may be in a network that is served by a different service provider than the service provider that owns the TAS 125.

Upon receipt of the SIP Invite 310 the DN B may respond by sending a SIP 180 ringing message 220 to the TAS 125. The TAS 125 may send a SIP Ringing 325 message to the device 105 associated with DN A. If the LNS AS 135 does not screen the call, the LNS AS 135 may send an HTTPS notify term rsp 330 to the TAS 125. The HTTPS notify term rsp 330 may be comprised of the principal directory number DN B, the linked directory number DN C and the originating directory number DN A.

In response to receipt of the HTTPS notify term rsp 330 the TAS 125 may send a SIP Invite 335 to the MGC 130 resident in the PSTN/PLMN 140. The SIP Invite 335 may be comprised of the calling directory number DN A and the linked directory number DN C. The SIP Invite 335 may be forwarded via the PSTN/PLMN 140 to the MSC 150. The MSC 150 may send a CAMEL Initial DP 12 (340) message to the LNS AS 135. The Initial DP message 340 may be comprised of the calling party number DN A and the linked directory number DN C.

Because the LNS AS 135 stored the calling party number, the principal directory number, and the linked directory number received in the HTTPS notify message 315, the LNS AS can correlate the calling party number and the linked directory number of the Initial DP 340 with the stored calling party number and linked directory number. Thus, the LNS AS 135 knows that this is an incoming linked number service call associated with the principal directory number DN B. The LNS AS 135 may look up the principal directory number and determine that a distinctive ring tone should be used to alert the called party based on the calling party number and the linked directory number contained in the Initial DP 340.

The LNS AS 135 may send a CAMEL Continue message 345 to the MSC 150 of the PSTN/PLMN 140. The Continue message 345 may result in the PSTN/PLMN sending a setup or alert message 350 via the BSC 145 to the PDA 120. The alert message 350 may note the distinctive ringing pattern that the PDA 120 should use. Thus a subscriber that hears the ringing pattern knows that the call was originally a call placed to his business phone 110. The PSTN/PLMN 140 may send a SIP 180 Ringing message 355 that is forwarded to the TAS 125. At this point, the communication device associated with the primary directory number DN B 110 and the communication device associated with the linked directory number DN C 120 are ringing. Whichever communication device 110, 120 picks up first may be connected to the calling device 105. If neither device 110, 120 picks up, the call may go to the voice-mail associated with the primary directory number.

Figure 4:
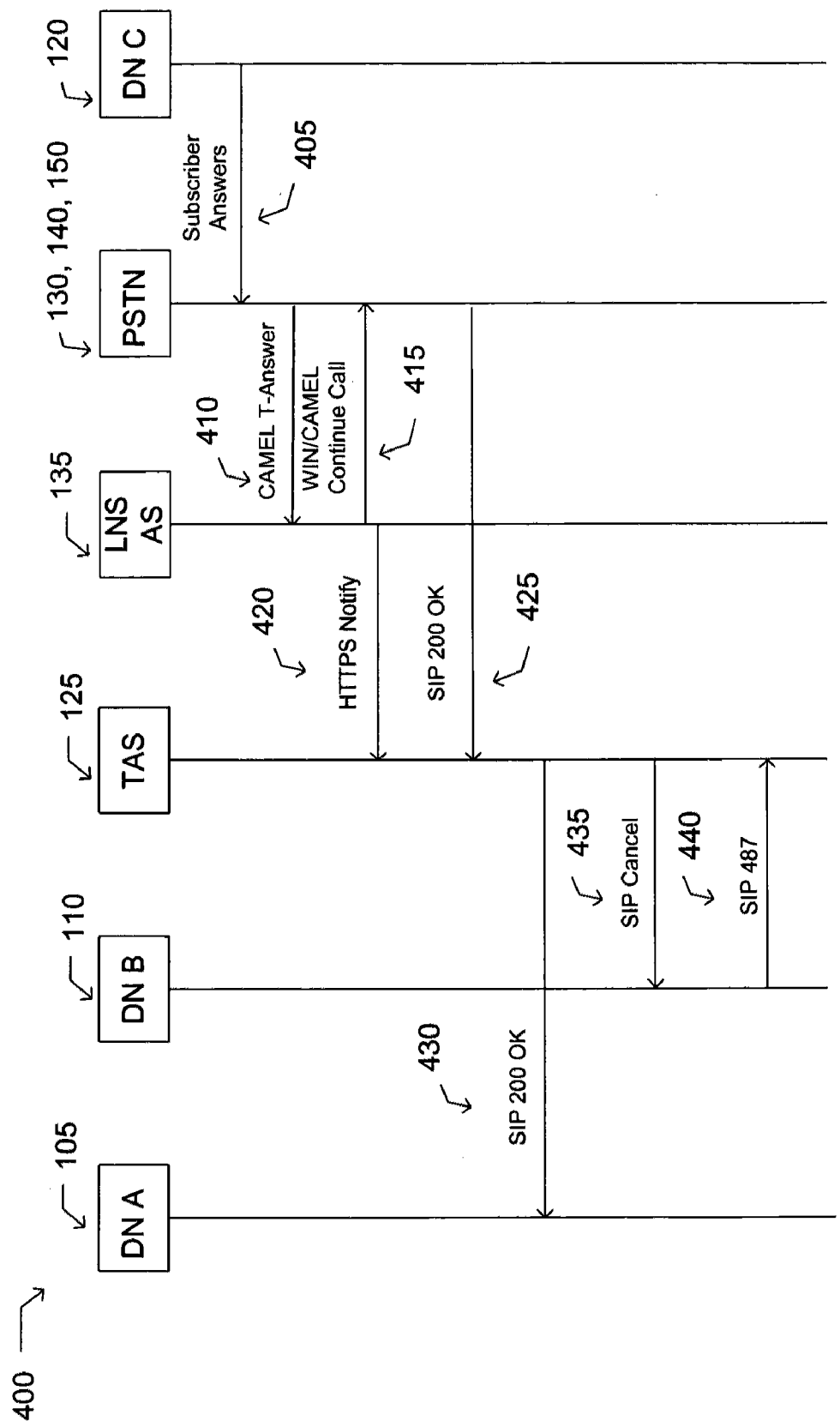
FIG. 4 is a representation of one message flow of an answered call to a principal directory number.

Turning now to FIG. 4 that depicts a call flow associated with a call to a principal directory number where the call is answered on communication device associated with a directory number that is linked to the principal directory number. In this scenario, a call to the principal directory DN B has resulted in both the communication device associated with DN B, phone 110, and the communication device associated with the linked directory number DN C, PDA 120, ringing and waiting for a subscriber to answer. When the subscriber answers the call using the PDA 120, the PDA 120 sends an Answer message 405 to the MSC 150. Because a CAMEL T-Answer detection point (DP) is armed, the MSC 150 may send a T-Answer 410 to the LNS AS 135. The LNS AS 135 may return a Continue message 415 to the MSC 150. The LNS AS 135 may also send an HTTPS notify 420 to the TAS 125. The HTTPS notify 420 may be comprised of the principal directory number, the linked directory number and calling directory number. The HTTPS notify message 420 may inform the TAS 125 that the subscriber has answered the call on the PDA 120.

When the MSC 150 receives the Continue message 415, the MSC 130 may send an Answer message that is relayed through the PSTN/PLMN 140 to the MGC 130. The MGC 130 may convert the Answer message into a SIP 200 OK 425 that the TAS 125 receives. The SIP 200 OK 425 indicates to the TAS 125 that the leg to the linked directory number DN C is answered. The HTTPS notify message 420 confirms that the call is answered on the PDA 120, as opposed to being answered by some other communication device based on a telecommunication service subscribed for DN C, such as, voice mail or call forwarding. Thus, when the TAS 125 receives both the SIP 200 OK 425 and the HTTPS notify message 420, the TAS 125 knows that the call leg to the linked directory number DN C was answered by the subscriber using the communication device associated with the linked directory number, and was not, for example, "answered" by a voice mail system.

The TAS 125 now knows that the call is answered on the PDA 120, the call can now be connected through from the PDA 120 to the calling device 105. The TAS may send a SIP 200 OK message 430 to the calling device 105 to let the calling device 105 know that the call is answered. The call leg from the calling party may be connected to the call leg that was established to the PDA 120. The TAS 125 may also drop the call leg to the device 110 by sending a SIP Cancel 435 message to the device 110. The device 110 may acknowledge with a SIP 487 440. The call to the subscriber's work number DN B has been answered by the subscriber on his communication device 120 and the subscriber may now be connected with the caller.

Figure 5:
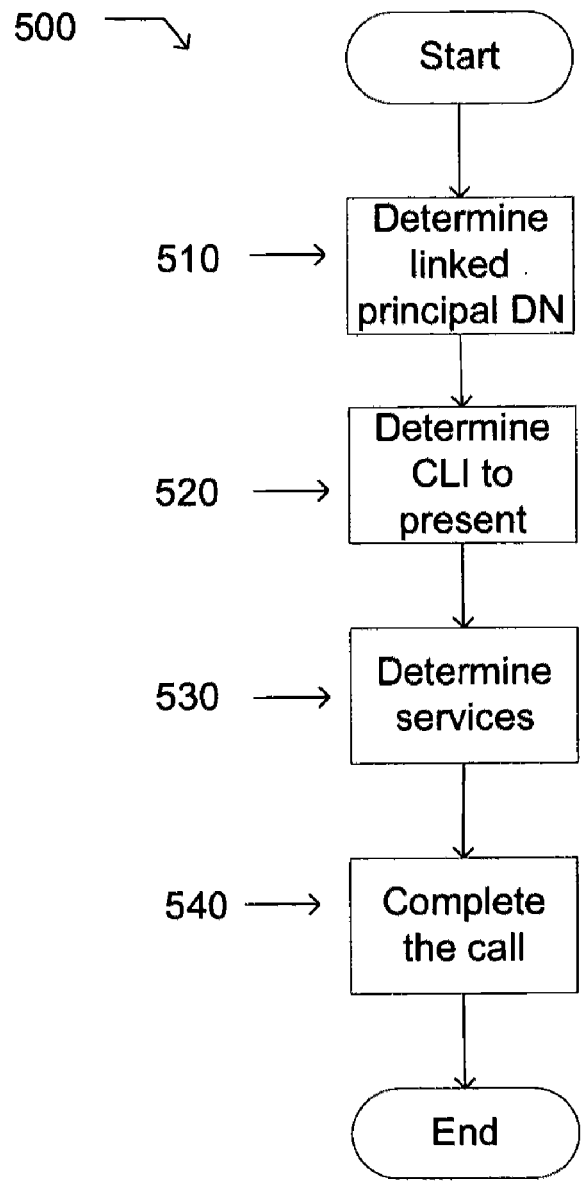
FIG. 5 is a representation of a flow chart of a call origination from a directory number linked to a principal directory number.

Turning now to FIG. 5, which is a call flow that illustrates a method 500 that may be associated with a call from a communication device that is associated with a directory number that is linked to a principal directory number. In example, it has already been determined that the call is a linked number service call. In step 510, the method 500 determines that the directory number is linked to a principal directory number.

In step 520, the method determines which CLI to present to the called party. In some embodiments, the CLI to present may be determined by the method 500 based on a directory number the calling party dialed, a time of day, or an entered star code. The CLI to present may be stored in a table that, that may reside on the LNS AS 135, the TAS 125 or any other network node that may be in communication with the LNS AS 135. The table may be configured such that different criteria for presenting the CLI are given different precedence. Thus, for example, the table may be configured such that the dialed number has precedence. Therefore, if the subscriber calls a client, then regardless of the time of day or star code dialed, the CLI may be the principal directory number, where the principal directory number may be the subscriber's work number. The precedence of each parameter may be configurable by the subscriber or network operator.

In step 530, the method 500 determines services that should be applied to this call. Services that are associated with the linked principal directory may be applied to the call. In this example, the principal directory number may be a business number. If the directory number is associated with a personal mobile phone and the linked principal directory number is associated with a work phone, services available on the work phone may be available when dialing from the mobile phone. For example, abbreviated dialing may be available on the mobile phone. Thus, the mobile phone subscriber may be able to reach a workmate by simply dialing the workmate's extension. Restrictions as well as services may apply to calls originated from the mobile phone using the linked number service. Therefore, if the principal directory number is a work number that does not allow long distance calls, long distance calls from the mobile phone may not be allowed if the linked number service is used.

Figure 6:
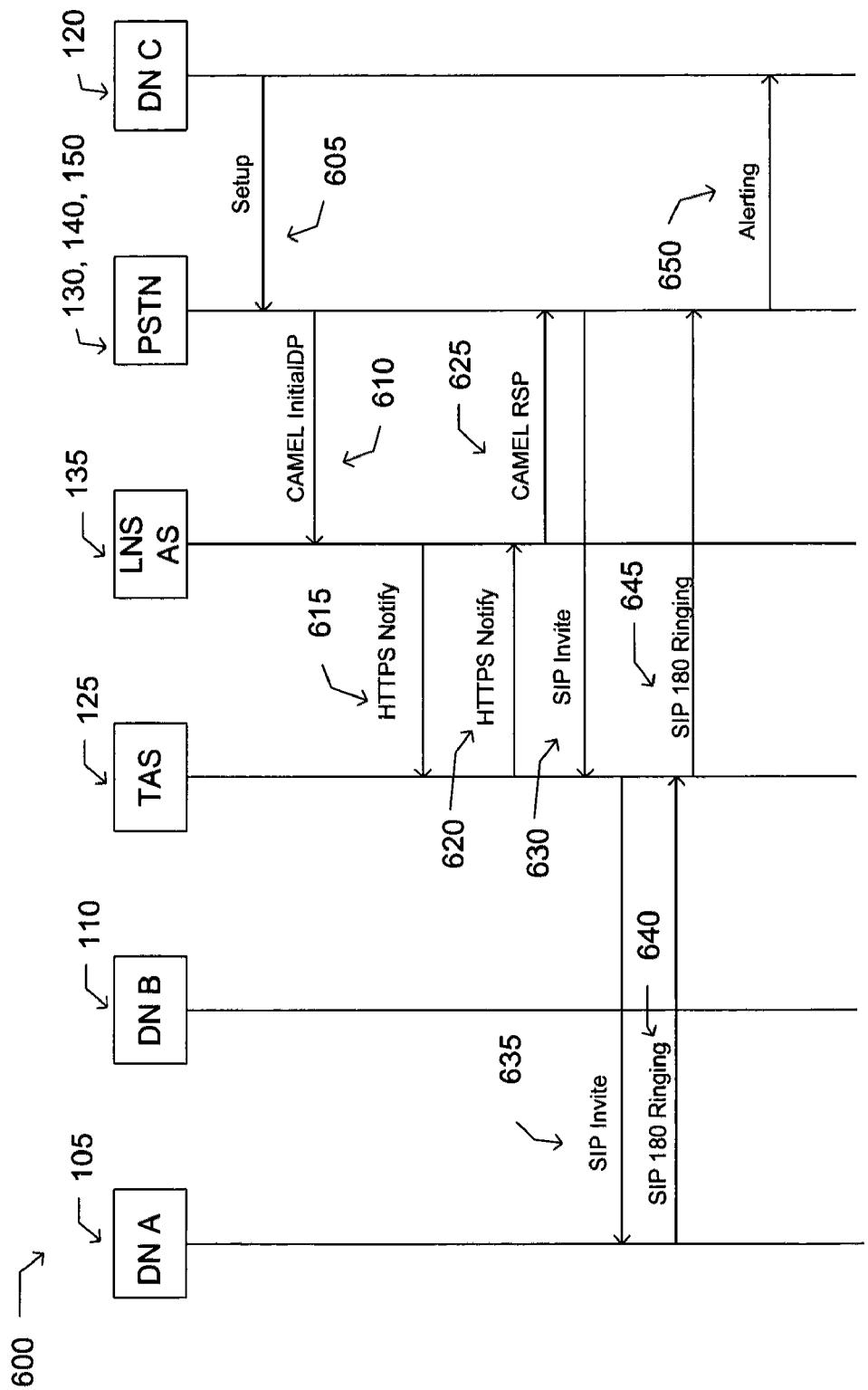
FIG. 6 is a representation of a message flow of a call originated by a directory number linked to a principal directory number.

In step 540, the mobile origination is completed or connected. A message flow may illustrate how a call is completed when the call is made from a directory number that is linked to a principal directory number. Turning now to FIG. 6, which illustrates a message flow 600 associated with a call made from a directory number that is linked to a principal directory number. The directory number of the communication device may be linked to a principal directory number. In this example, for purposes of illustration, the PDA 120 originates the call. The PDA 120 may be associated with the directory number DN C. The called number is the directory number DN A associated with the device 105. Tables resident on the LNS AS 135 may be configured such that DN C is linked to the principal directory number DN B where DN B is associated with the device 110.

When a subscriber originates the call, the PDA 120 may send a mobile origination message such as a Setup message 605 to the MSC 150. When the call is originated, the subscriber may indicate, as described above, that this is a linked number service call. Because an InitialDP DP 2 is armed, the MSC 150 may send a CAMEL InitialDP message 610 via an SS7 signaling network to the LNS AS 135. The LNS AS 135 may determine if the linked number service should be performed. Assume the subscriber dialed an abbreviated four digit directory number which results in the LNS AS 135 performing the linked number service with DN B as the CLI.

The LNS AS 135 may send an HTTPS notify message 615 to the TAS 125, notifying the TAS 125 that DN C is originating a call as DN B. The HTTPS notify message 615 may comprise, but is not limited to, the principal directory number, the originating directory number, and the called directory number. The TAS 125 may store the information comprising the HTTPS notify message for later reference. The TAS 125 may send an HTTPS notify message 620 to the LNS AS 135 notifying the LNS AS 135 that the linked number service call is allowed and should be connected to DN B.

The LNS AS 135 may send a CAMEL Rsp message 625 to the MSC 150 with instructions to route the call DN B. The call is routed through the PSTN/PLMN 140 to the TAS 125 since the TAS 125 is the application server responsible for providing telephony services for DN B. In routing the call, the PSTN/PLMN 140 may send a SIP Invite message 630 to the TAS 125. The TAS 125 recognizes that the call is from a directory number that is linked to DN B, that is, the call is from DN C. The TAS 125 may look up the dialed number based on the information stored upon receipt of the HTTPS notify message 615. The TAS 125 may set up the call to DN A, the originally dialed number. The TAS 125 may set up the call by sending a SIP Invite 635 to DN A. DN A may respond by sending a SIP 180 Ringing message 640 to the TAS 125. The TAS 125 may forward the SIP 180 Ringing message 645 to the PSTN/PLMN 140. The PSTN/PLMN 140 may send an Alert message 650 to the PDA 120 to alert the PDA 120 that the communication device 105 is ringing.

Note that the communication devices 110, 120 do not have to be served by the same MSC or by the same service provider to take advantage of the linked number service. Indeed, the two devices 110, 120 do not even have to be registered in the same network to invoke and use the linked number service. Even if the devices 110, 120 are registered in two different networks served by two different service providers, a call to a primary directory number in one network may be completed to a linked communication device registered and served in a completely different network.

Although in the examples presented so far, the principal directory number has been illustrated as associated with an office phone and the linked directory number has been illustrated as associated with a mobile, it could be the case that the principal directory number is associated with the mobile phone and the linked directory number is associated with the office phone. Furthermore, although in the examples given only one directory number has been linked with a principal directory number, a principal directory number may have more than one linked directory number. Also, either the principal directory number or the directory number may be associated with a home phone.

The linked number service may be used in conjunction with a home phone system. The linked number service may be configured such that a call to a primary directory number rings a mobile phone and a linked home phone if the subscriber is "at home", that is if the subscriber's mobile phone is in or near the home. Whether a subscriber is in or near the home may be determined, for example, by geo location or by use of a low powered base station in the home.

Figure 7:
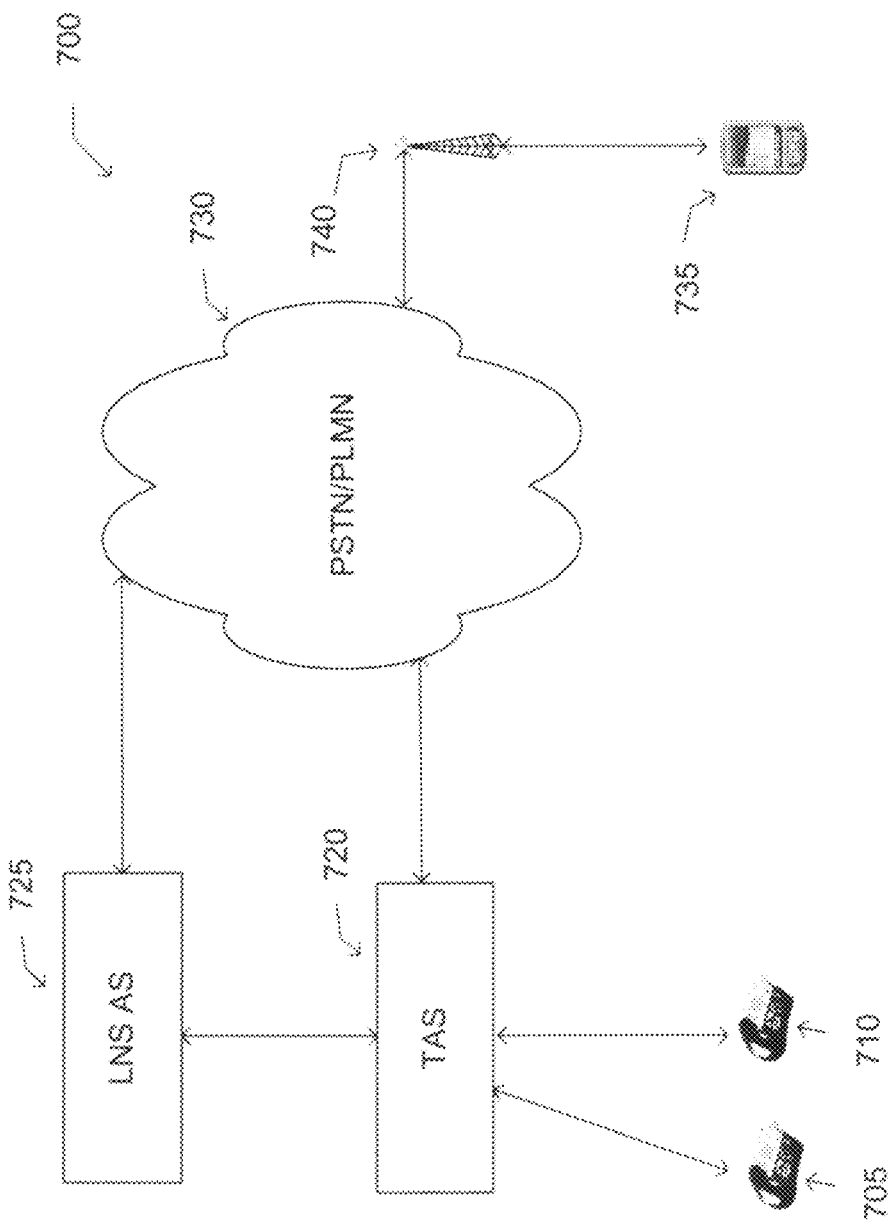
FIG. 7 is a representation of one implementation of a second system that may comprise the linked number service.

As previously mentioned, the linked number service may be practiced using other architectures. Turning now to FIG. 7, which is a second system 700 that may support the linked number service. The system 700 may be comprised of at least one communication device 705, 710 which is coupled to a TAS 720. The TAS 720 may be communicatively coupled to an LNS AS 725. The LNS AS 725 may be further communicatively coupled to a telephony network or PSTN/PLMN 730. The PSTN/PLMN 730 may be further communicatively coupled to at least one communication device 735 via a BSC 740.

The communication devices 705, 710 depicted in the system 700 may be office phones connected to the TAS 720 via an IP connection. Although the system 700 shows the communication devices 705, 710 as part of an IP network in communication with the TAS 720, the communication devices 705, 710 may be communicatively coupled with other intermediary network components, such as a PBX, a Centrex or any other network node capable of operating in a telecommunications system. Further, even though the communication devices 705, 710 are IP devices, the devices 705, 710 may be circuit switched, wireless or any other type of device that is capable of completing a communication session.

In the system depicted 700, the TAS 720 may be communicatively coupled with the devices 705, 710 using a SIP protocol. The LNS AS 725 may be communicatively coupled with the TAS 720 using an HTTPS protocol. The HTTPS protocol may be used to send proprietary messages between the TAS 720 and the LNS AS 725. The TAS 720 may be communicatively coupled with the PSTN/PLMN 730 with the SS7 protocol. The PSTN/PLMN 730 may be communicatively coupled with the PDA 735 via a BSC 740 using typical standard protocols that are well known in the art. The LNS AS 725 may send messages to the PDA 735 via the PSTN/PLMN 730 using a Short Message Service (SMS) protocol. One of ordinary skill in the art will readily appreciate that the SMS protocol is a protocol used to send text messages between communication devices, typically mobile communication devices. In this embodiment, however, the LNS AS 725 may communicate with an LNS application or data messaging application running on the PDA 735 by using the SMS protocol.

Figure 8:
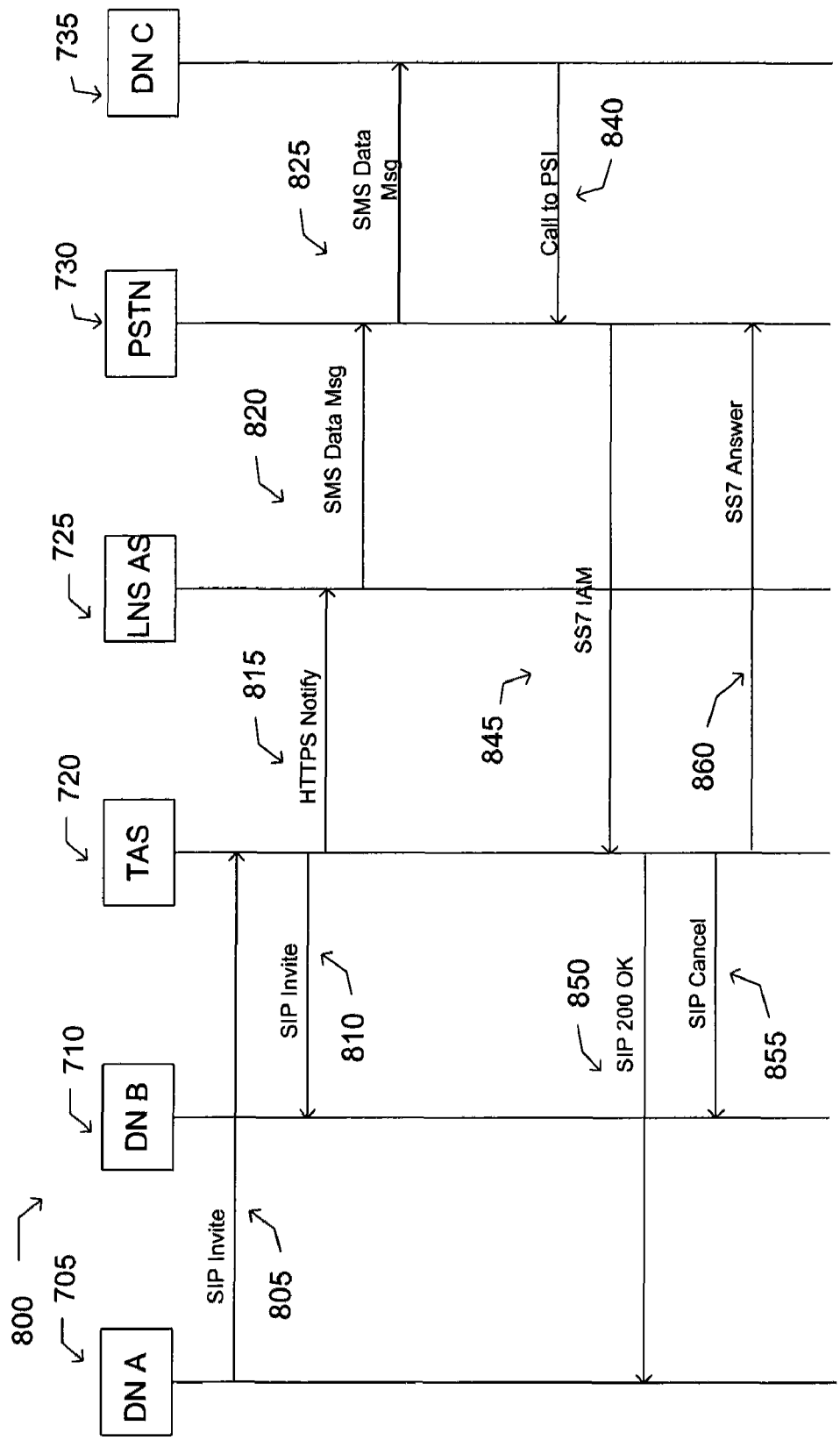
FIG. 8 is a representation of a message flow of a call to a principal directory number that may occur in the system depicted in FIG. 7.

Turning now to FIG. 8, which depicts a message flow 800 that may occur in the system 700 when a call is placed to a principal directory number that has a linked directory number. In this example, the principal directory number is DN B, which is associated with the communication device 710. The calling device is the communication device 705 or DN A. A directory number associated with the PDA 735 is directory number DN C.

If a call is placed from the device 705 to the device 710, a SIP Invite 805 may be sent to the TAS 720. The TAS 720 may determine that the call is placed to a device that is associated with the principal directory number DN B. The TAS 720 may send a SIP Invite message 810 to the called party, DN B. Because this is a call to a principal directory number, the TAS 720 may determine the directory numbers that are linked with DN B. In this example, the directory number DN C is linked with DN B. Because DN C is linked with the principal directory number DN B, the TAS 720 may attempt to establish a second call leg to DN C. The TAS 720, however, may not immediately complete the second leg call, instead the TAS 720 may "park" the second call leg, and send an HTTPS notify 815 message to the LNS AS 725.

Upon receipt of the HTTPS notify 815 message the LNS AS 725 may determine if the call should be screened based on time of day, or based on being on a black or white list. Further, the LNS AS 725 may send an SMS data message 820, 825 to the PSTN/PLMN 730, which forwards the SMS data message 820, 825 to DN C. Upon receipt of the Data Message 825, a mobile LNS application that may be running on the PDA 735, may alert a subscriber of the call by ringing the PDA 735. The mobile LNS application may be set up to use different ringing patterns based on the called number. Thus, whoever hears the ringing pattern may be able to determine which number the calling party dialed before answering the call.

Furthermore, because the mobile is alerted of the incoming call via an SMS message rather then through normal setup methods, the incoming call may not be affected by telecommunication services set up for the linked directory number. In other words, the linked number service call to the PDA 735 is not sent to voicemail or forwarded to another communication device if the call is not answered at the mobile device 735. The call may be answered via the mobile LNS application when the subscriber pushes a soft key. If the call is answered, the mobile LNS application may also initiate an outgoing call 840 from the PDA 735 to "pick up" the call leg. The called number for the outgoing call from mobile LNS application may be a Public Service Identity (PSI) number that is assigned to a network that serves the principal directory number. The call from the mobile LNS application is routed via the PSTN/PLMN 730 to the TAS 720 which serves the principal directory number. Part of routing the call involves the PSTN/PLMN 730 sending an SS7 IAM (initial address message) 845 to the TAS 720. The called party of the SS7 IAM message 845 may be the PSI number, and the calling party may be DN C.

Upon receipt of the SS7 IAM message 845, the TAS 720 may send a SIP 200 OK message 850 to device 705 to inform the device 705 that that call was answered. The TAS 720 may also send a cancel message to device 710 so that the device stops ringing and releases any resources allocated to the call attempt. The TAS 720 may send and SS7 Answer message 860 to the PSTN/PLMN 730 to connect the call from the PDA 735 to the device 705. At this point the call may be established.

Figure 9:
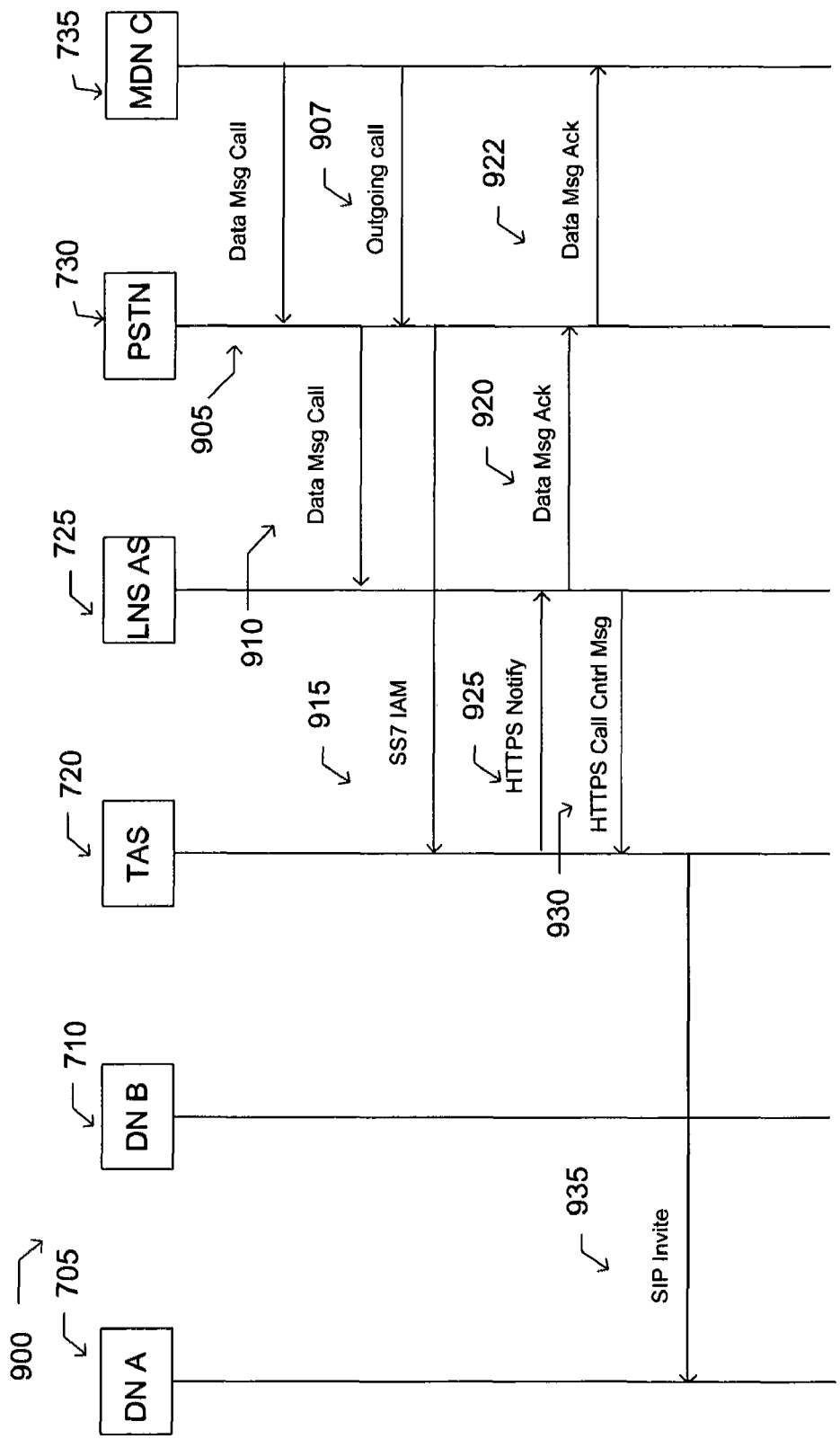
FIG. 9 is a representation of a message flow of a call originated by a directory number linked to a principal directory number, where the call occurs in the system depicted in FIG. 7.

Turning to FIG. 9, which is an example message flow that may occur in the system 700 when a call is placed from a directory number that is linked to a principal directory number. In this example, the principal directory number is a directory number associated with communication device 710, which is associated with DN B. The calling device is the PDA 735, which is associated with directory number DN C. The call is placed to directory number DN A, which is associated with the communication device 705.

To make a linked number service mobile origination with the PDA 735 to the device 705, a subscriber dials a called number, but rather than push a SEND button, the subscriber starts the call by pushing a soft key that has been set up on the PDA 735. A mobile LNS application running on the PDA 735 receives the input to start a linked number service call and may send an SMS data message 905 to the PSTN/PLMN 730. The PSTN/PLMN 730 may forward the SMS data message 910 to the LNS AS 725. The SMS data message 905, 910 may be comprised of a called number, DN A, a calling number, DN C, and a principal directory number, DN B. The LNS AS 725 may store the calling party number, the principal directory number, and the called number for future reference. The mobile LNS application may also initiate an outgoing call 907 to a PSI that is allocated to a TAS which serves the principal directory number linked to DN C. In this example the directory number DN C may be linked to the principal directory number DN B. The outgoing call may result in the PSTN/PLMN 730 sending an SS7 IAM message 915 to the TAS 720.

When the TAS 720 receives the SS7 IAM message 915, the TAS 720 may send an HTTPS notify message 925 to the LNS AS 725. The HTTPS notify message 925 may be comprised of at least the calling party number, DN C. Because the LNS AS 725 stored the calling number received in the SMS data message 905, the LNS AS 725 may determine that the HTTPS notify message 925 is associated with the SMS data message 905. The LNS AS 725 may then apply any originating services setup for the principal directory number DN B, such as outgoing call barring, abbreviate dialing, authorization codes and any other services that may be associated with the principal directory number.

Also, the LNS AS 725 may send an SMS data message 920, 922 to the PDA 735 via the PSTN/PLMN 730. Upon receipt of the HTTPS notify message 925, the LNS AS 725 may send an HTTPS Call Cntrl message 930 to the TAS 720 that instructs the TAS 720 to complete the call to the device 705 (DN A). The TAS 735 may send a SIP Invite 935 to the device 705 and await an answer.

Figure 10:
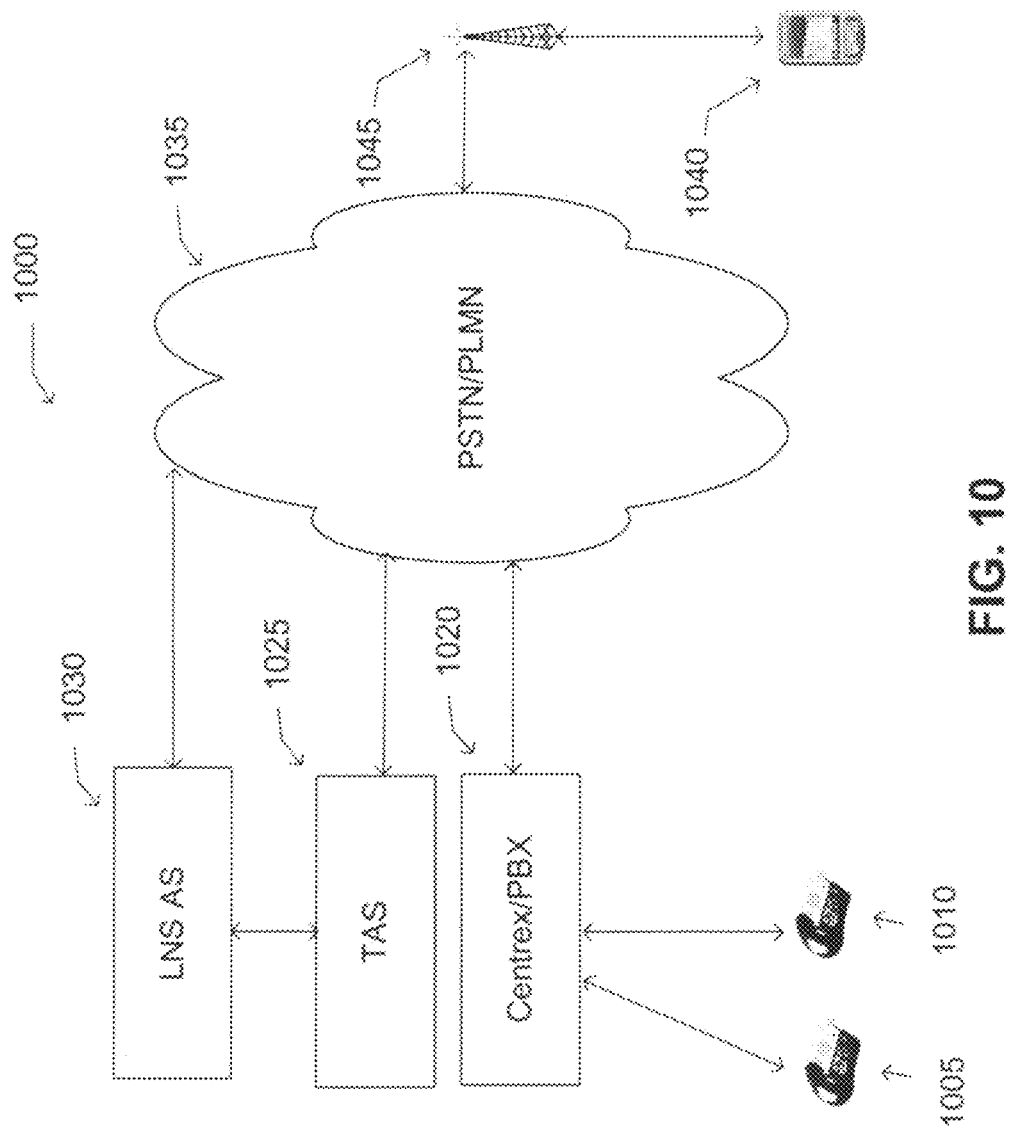
FIG. 10 is a representation of still another system that may embody the linked number service.

Even if the communication devices 705, 710 reside in an office that is served by a PBX or Centrex, the communication devices may be able to take advantage of the linked number service. Turning now to FIG. 10, which is the system 700 modified to include a PBX or Centrex 1020. The PBX/Centrex 1020 may be communicatively coupled to communication devices 1005, 1010. The PBX/Centrex may also be communicatively coupled to a telephony network 1035. The telephony network or PSTN/PLMN 1035 may be comprised of one or more PSTNs and PLMNs in combination. The PSTN/PLMN 1035 may be communicatively coupled to a TAS 1025 and the TAS 1025 may be communicatively to an LNS AS 1030. The LNS AS 1030 may be communicatively coupled with the PSTN/PLMN 1035. The PSTN/PLMN 1035 may be communicatively coupled with a BSC 1045, which is communicatively coupled with a communication device 1040 which may be a PDA 1040.

The interface between the communication devices 1005, 1010 and the Centrex/PBX 1020 in this example is a SIP interface. The interface, however, may be any interface that is capable of supporting communication between a PBX or Centrex and a communication device. The interface between the Centrex/PBX 1020 and the PSTN/PLMN 1035 may be an SS7 interface. The interface between the TAS 1025 and the PSTN/PLMN 1035 may also be an SS7 interface. The interface between the TAS 1025 and the LNS AS 1030 may be a proprietary HTTPS interface. The interface between the LNS AS 1030 and the PSTN/PLMN 1035 may be an SMS interface. The interface between the PSTN/PLMN 1035 and the BSC 1045, and the interface between the BSC 1045 and the communication device 1045 may be any know standard or proprietary interfaces for these components.

To support the linked number service with the system 1000, the PBX/Centrex 1020 may support the simultaneous ringing feature. The simultaneous ringing feature needs to be assigned to each office desk directory number which is to be linked to another directory number. There should be a single child number in the simultaneous ring list; this number should be a unique number per desk phone that routes to the TAS; this number is hereafter referred to as the principal number alias. The linked number service feature is assigned to the principal number alias in the TAS; the number of the employee's second phone to be used as a linked directory number is designated as part of the linked number service feature data set up for the principal number alias. When the work number is called the PBX/Centrex rings the office phone as well as forks a call leg to the principal number alias set up in the simultaneous ring list for this work number. A more detailed description of the feature may be shown using a call flow diagram.

Figure 11:
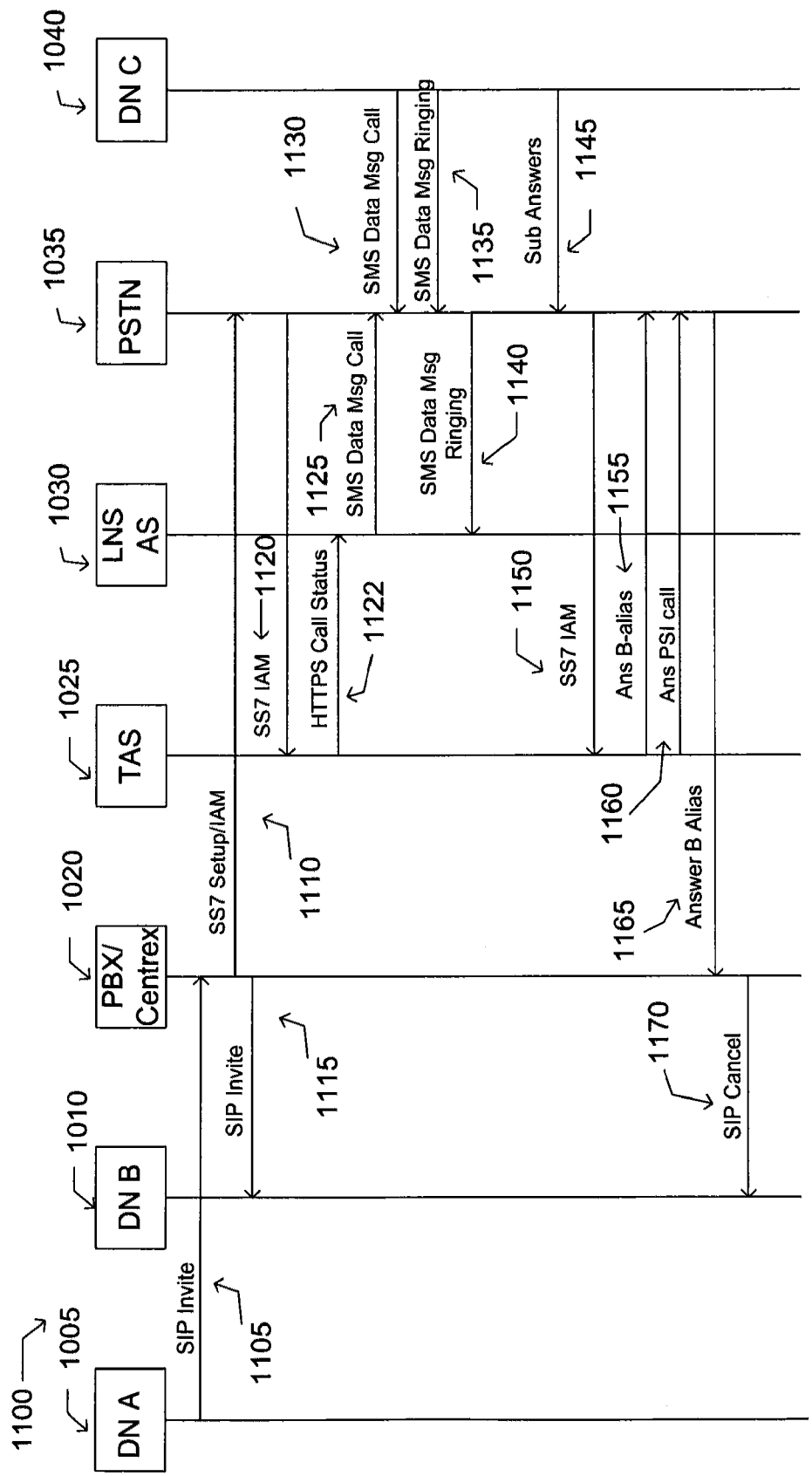
FIG. 11 is a representation of one message flow of a call to a principal directory number that occurs in the system depicted in FIG. 10.

Turning now to FIG. 11, which is a call flow diagram of a call origination that may occur in the system 1000. The call is made from device 1005 to device 1010. Device 1005 may be associated with the directory number DN A, and the device 1010 may be associated with directory number DN B. The directory number DN B may be a principal directory number that is linked with the directory number DN C. A call is placed to DN B from DN A. Because the directory number DN C is linked with the principal directory number alias for DN B, the call to directory number DN B may result in the directory number DN B being alerted along with the directory number DN C.

When the device 1005 initiates a call, a SIP Invite message 1105 may be sent to the PBX/Centrex 1020. The PBX/Centrex 1020 may send an SS7 Setup IAM message 1110 to the PLMN/PSTN 1035 with a calling party number set to DN A, and a called party number set to a DN B alias. The PBX 1025 may also send a SIP Invite message 1115 to DN B. The communication device 1010 associated with DN B may now start ringing.

The IAM message 1110, 1120 may be routed through the PLMN/PSTN 1035 to the TAS 1025. Because the DN B alias may be a principal directory that is linked to DN C, the TAS 1025 may translate the DN B alias to a call to DN C and send an HTTPS call status message 1122 to the LNS AS 1030. The TAS 1025 may store for future reference the DN B alias that is associated with the DN C. The LNS AS 1030 may then send an SMS data message 1125, 1130 that is routed to the communication device 1040 associated with DN C. An LNS application running on the communication device 1040 receives the data message 1125, 1130, rings the communication device 1040, and sends a data message 1135, 1140 back to the LNS AS 1030 to indicate that the communication device 1040 is ringing. If the call is answered on the communication device 1040, the LNS application on PDA 1040 initiates a call 1145 to a PSI that is assigned to a TAS that serves the principal directory number DN B alias.

The PLMN/PSTN 1035 may send an SS7 IAM message 1150 to the TAS 1025 for the call to the PSI. The TAS 1025 may determine that a calling party number in the IAM message 1150 is DN C. The TAS 1025 may also note that the directory number DN C is associated with the alias DN B and that a call to DN C is parked. The TAS 1025 may then send an SS7 Answer message 1155 to the PLMN/PSTN 1035 that indicates the call to DN B alias is answered. The TAS 1025 may also send an SS7 Answer message 1160 to the PLMN/PSTN 1035 that indicates that the call to the PSI was also answered. The SS7 Answer 1160 sent on behalf of the PSI connects the call from DN A to the communication device DN C. An SS7 Answer 1165 on call leg B is sent to the PBX/Centrex 1020 which results in the PBX/Centrex 1020 sending a SIP Cancel message 1170 to DN B. At this point the call is set up and DN A is connected to DN C.

The systems 100, 1000 in one example comprise a plurality of components such as one or more of computer software components. A number of such components can be combined or divided in the systems 100, 1000. An example component of the systems 100, 1000 employs and/or comprises a set and/or series of computer instructions written in or implemented with any or a number of programming languages, as will be appreciated by those skilled in the art. The systems 100, 1000 in one example comprise a horizontal orientation, with the description and figures herein illustrating one example orientation of the systems 100, 1000 for explanatory purposes.

The systems 100, 1000 in one example employs one or more computer-readable signal-bearing media. The computer-readable signal-bearing media store software, firmware and/or assembly language for performing one or more portions of one or more implementations of the invention. The computer-readable signal-bearing medium for the system 100, 1000 in one example comprises one or more of a magnetic, electrical, optical, biological, and atomic data storage medium. For example, the computer-readable signal-bearing medium comprises floppy disks, magnetic tapes, CD-ROMs, DVD-ROMs, hard disk drives, and electronic memory.

The steps or operations described herein are just for example. There may be many variations to these steps or operations without departing from the spirit of the systems 100, 1000 and methods 200, 300, 400, 500, 600, 700, 800, 900, 1100. For instance, the steps may be performed in a differing order, or steps may be added, deleted, or modified.

Although example implementations of the system 100, 1000 and method 200, 300, 400, 500, 600, 700, 800, 900, 1100 have been depicted and described in detail herein, it will be apparent to those skilled in the relevant art that various modifications, additions, substitutions, and the like can be made without departing from the spirit of the method 200, 300, 400, 500, 600, 700, 800, 900, 1100 and these are therefore considered to be within the scope of the systems 100, 1000 and method 200, 300, 400, 500, 600, 700, 800, 900, 1100 as defined in the following claims.

I claim:

1. A method comprising the steps of:
   providing table of principal directory numbers and directory numbers for communication devices connected to a communication network in a network node, wherein one or more directory numbers may be linked to a principal directory number;
   receiving a call to a principal directory number;
   determining if the principal directory number is linked to one or more directory numbers;
   if so, initiating a communication session to a communication device associated with the principal directory number and a initiating a communication session to one or more communication devices associated with the one or more directory numbers linked to the principal directory number by parking the call;
   if the call is answered by the communication device associated with the principal directory number first, connecting the call to that communication device and cancelling the communication session with the one or more communication devices associated with the one or more directory numbers;
   if the call is answered by one of the communication devices associated with the directory number first, completing the communication session by delivering the parked call and cancelling the communication session with the communication device associated with the primary directory number.

2. The method of claim 1 further comprising the steps of:
   receiving a call for a communication session with a called party from a communication device associated with a directory number acting as an originating communication device;
   determining if the directory number is linked to a principal directory number associated with the originating communication device;
   selecting a calling line identifier to present to the called party; and
   alerting the called party using the selected calling line identifier.

3. The method of claim 2 wherein selecting a calling line identifier to present to the called party further comprises:
   determining if a default calling line identifier was overridden by a star code and using a calling line identifier entered by a subscriber using the originating communication device if the star code was dialed;
   determining a calling line identifier to present based on a time of day the communication session was originated; and
   determining a calling line identifier to present based on a called directory number.

4. The method of claim 1 wherein the initiating step further comprises the steps of:
   determining and invoking services available on the principal directory number; and
   alerting the principal directory number and zero or more directory numbers linked to the principal directory number.

5. The method of claim 4 wherein determining and invoking services available on the principal directory number further comprises:
   determining if the zero or more linked directory numbers are associated with at least one of a white list and black list and screening calls based on at least one of a white list and black list;
   determining if calls to the zero or more linked directory numbers are screened based on a time-of-day;
   illuminating a message waiting indicator associated with the principal directory number on a terminating communication device associated with a linked directory number if a message is left for the principal directory number; and
   delivering a message to the terminating communication device associated with a directory number if a text message is sent to the principal directory number.

6. The method of claim 1 further comprising:
   an account is billed based on a subscriber selected calling line identification;
   an account is billed based on whether a communication session is established while invoking the linked number service;
   per call charges may be billed to a selected account owner associated with at least one of a directory number and a principal directory number; and
   a principal directory number and directory number have separate accounts.

7. The method of claim 1 wherein a first telephony-switching device serves a first communication device associated with the principal directory number and a second telephony-switching device serves a second communication device associated with a directory number linked to the principal directory number; and
   the first communication device is served by a first service provider and the second communication device is served by a second service provider.

8. An apparatus for processing calls between a first communication device and a second communication device, both communicatively coupled to a communication network comprising:
- a telephony application server (TAS);
- a linked number service application server (LNS);
- one or more interfaces communicatively coupling the TAS and the LNS with the first and second communication devices; and
- wherein when the TAS receives a call from the second communication device the TAS originates a communication session using the first communication device identifier; and
- calls to the first communication device are parked in the communication network to wait for an answer from the second communication device and initiate a communication session with the first communication device.

9. The apparatus of claim 8 wherein the second communication device further comprises a data messaging application that alerts a subscriber of the second communication device that a communication session terminated to the first communication device is parked and allows the subscriber to answer the communication session to the first communication device that is parked.

10. The apparatus of claim 8 wherein if the second communication device does not answer an attempt to terminate a communication session, telecommunication services of the second communication device do not answer the communication session.

11. The apparatus of claim 8 wherein the telephony application server provides originating services assigned to the first communication device for the communication session originated by the second communication device.

12. The apparatus of claim 8 wherein:
- the first communication device identifier is a principal directory number and the second communication device identifier is a directory number;
- the first communication device is associated with the principal directory number, and the second communication device is associated with the directory number, the principal directory number is linked with the directory number;
- an attempt to establish a communication session to a communication device associated with the principal directory number results in alerting the first communication device and the second communication device; and
- the second communication device originates a communication session such that the calling line identification presented to the called party is the principal directory number of the first communication device.

13. The apparatus of claim 12 wherein:
- an attempt to terminate a communication session to the first communication device results in a distinctive ringing pattern on the second communication device;
- an attempt to terminate a communication session to the first communication device that is not answered on the first communication device or on the second communication device is forwarded to a voice mail associated with the first communication device;
- features available to the first communication device are available to the second communication device when the second communication device originates a communication session invoking the linked number service;
- restrictions for the first communication device apply to the second communication device when the second communication device originates a communication session invoking the linked number service;
- the second communication device originates a communication session using the principal directory number as the calling line identification even though the first communication device is not registered in and not served by the network serving the second communication device;
- the second communication device receives a communication session termination where the communication session was placed to the first communication device even though the second communication device is not registered in and not served by the network where the first communication device is registered; and
- a network serving the second communication device does not connect a call based on telecommunication services set up for the second communication device if the second communication device is unable to answer a communication session termination attempt where the communication session was placed to the first communication device and forwarded by the linked number service to the second communication device.

14. The apparatus of claim 12 wherein if a principal directory number is linked with a directory number, the principal directory number and the directory number must be enrolled in the linked number service.

15. The apparatus of claim 12 wherein:
- attempts to establish a communication session with the second communication device are screened based on at least one of a white list and black list when the second communication device is alerted because of a call placed to the first communication device;
- attempts to establish a communication session with the second communication device are screened based on a time of day when the second communication device is alerted because of a call placed to the first communication device;
- the second communication device comprises a plurality of message waiting indicators, wherein at least one message waiting indicator is associated with the directory number and at least one message indicator is associated with the principal directory number, and a first message waiting indicator illuminates if a message is left for the first communication device and a second message waiting indicator illuminates if a message is left for the second communication device;
- text messages sent to the first communication device are forwarded to the second communication device;
- the second communication device presents as a calling line identifier, based on a time of day, one of the directory number and principal directory number;
- the second communication device presents as a calling line identifier, based on a dialed directory number, one of the principal directory number and directory number; and
- the second communication device presents as a calling line identifier, based on a dialed star code, one of the principal directory number and directory number.

16. The apparatus of claim 12 wherein:
- an account is billed based on a calling line identification selected for presentation;
- an account is billed if linked number service is invoked for a communication session; and a principal directory number and directory number have separate accounts.

17. The apparatus of claim 12 wherein the first communication device is served by a first mobile switching center and the second communication device is served by a second mobile switching center; and the first communication device is served by a first service provider and the second communication device is served by a second service provider.

* * * * *